Dec. 12, 1933.  E. A. DEMPSEY  1,939,605
MOTOR VEHICLE BRAKE
Filed June 10, 1932  4 Sheets-Sheet 4
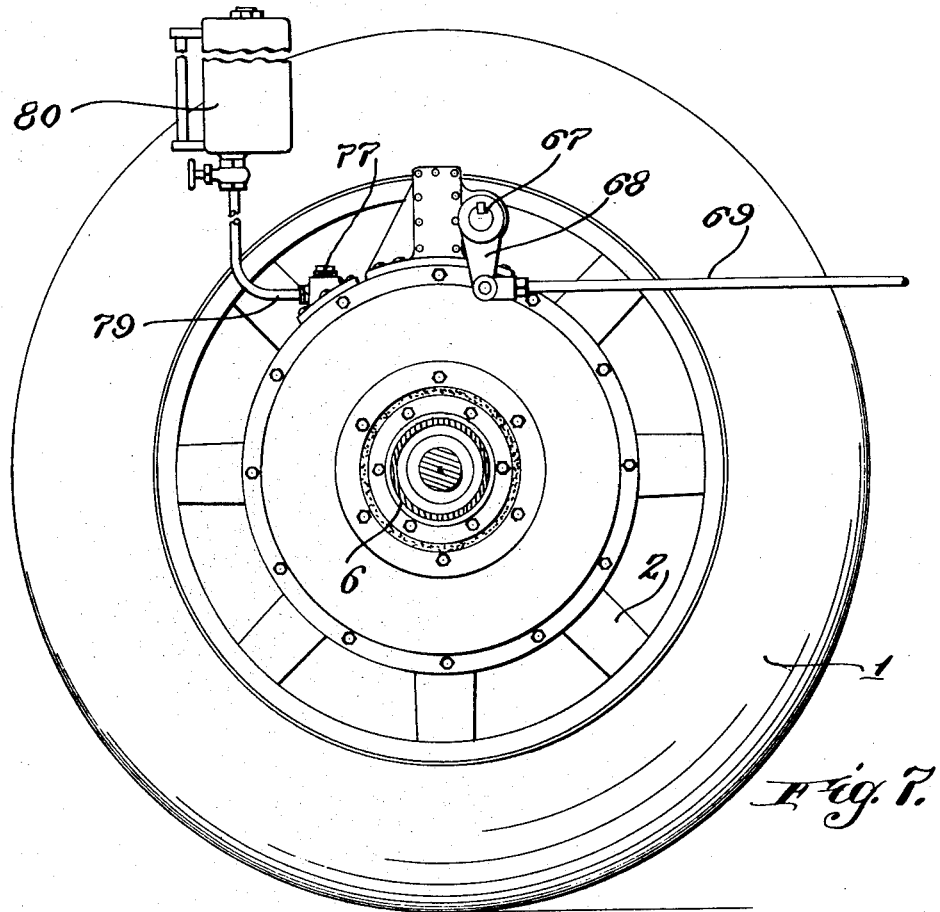
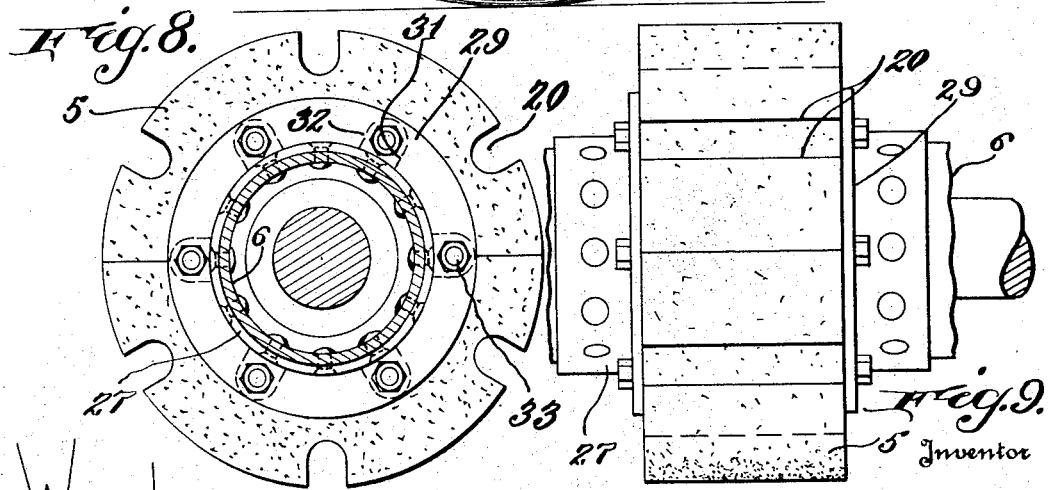

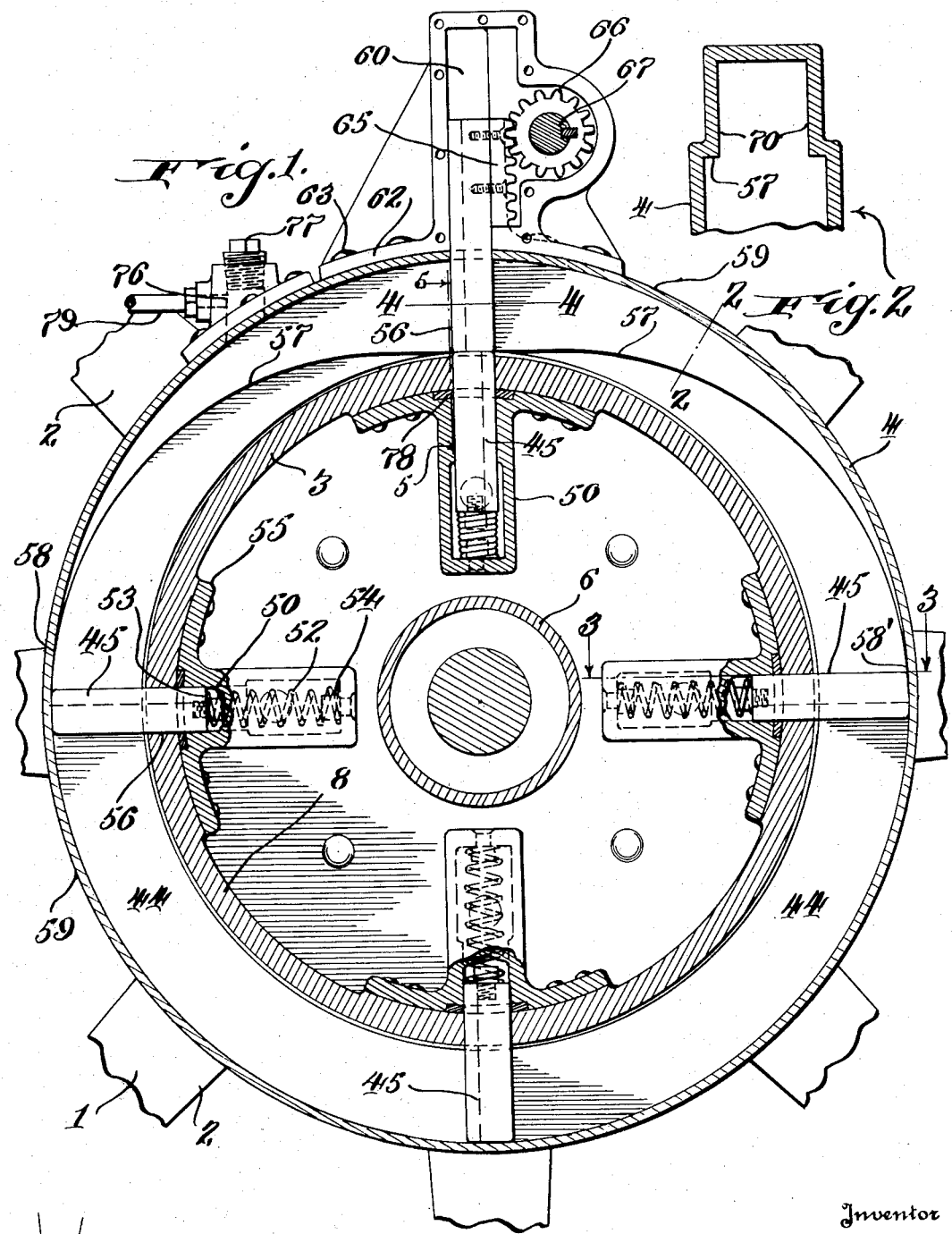

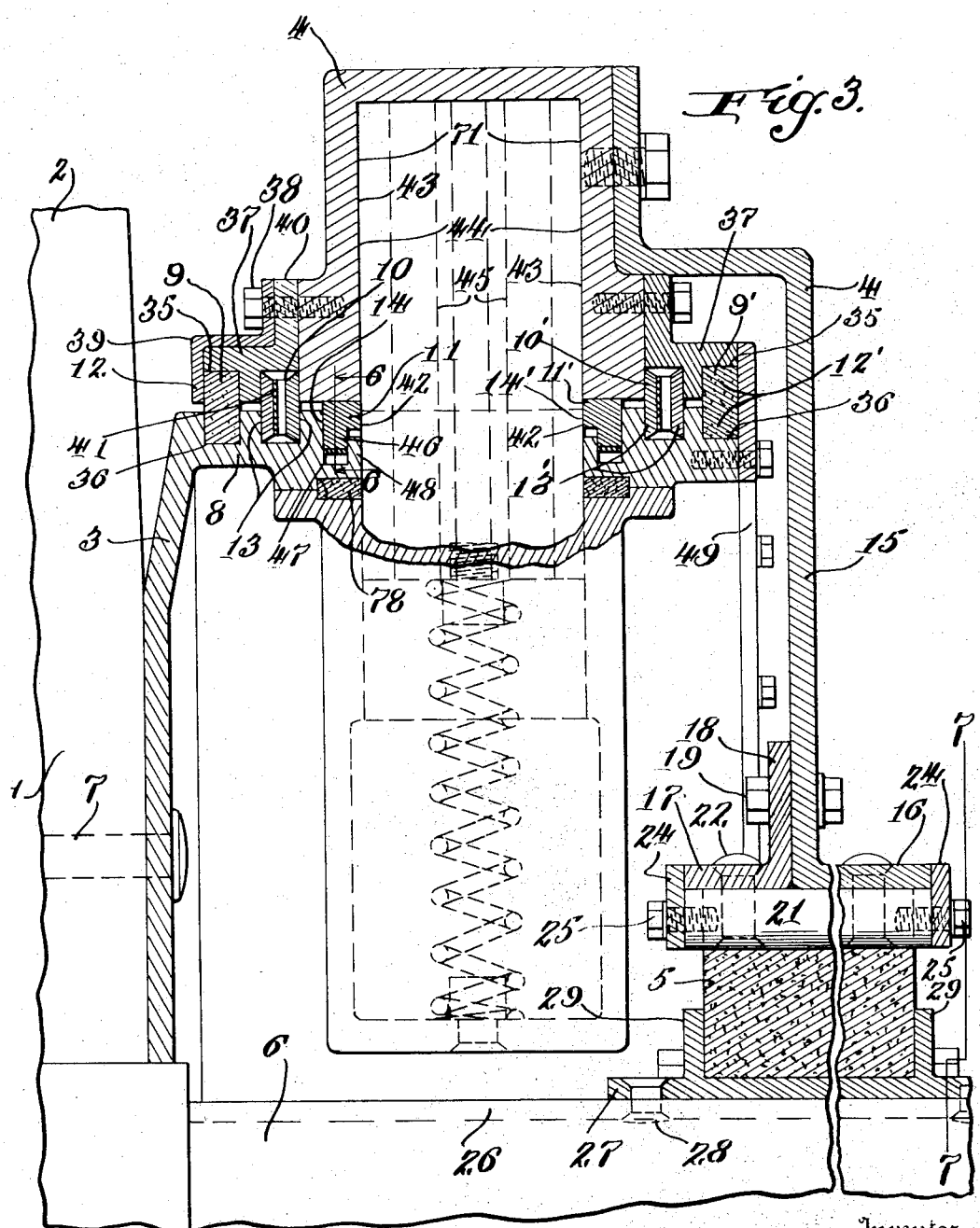

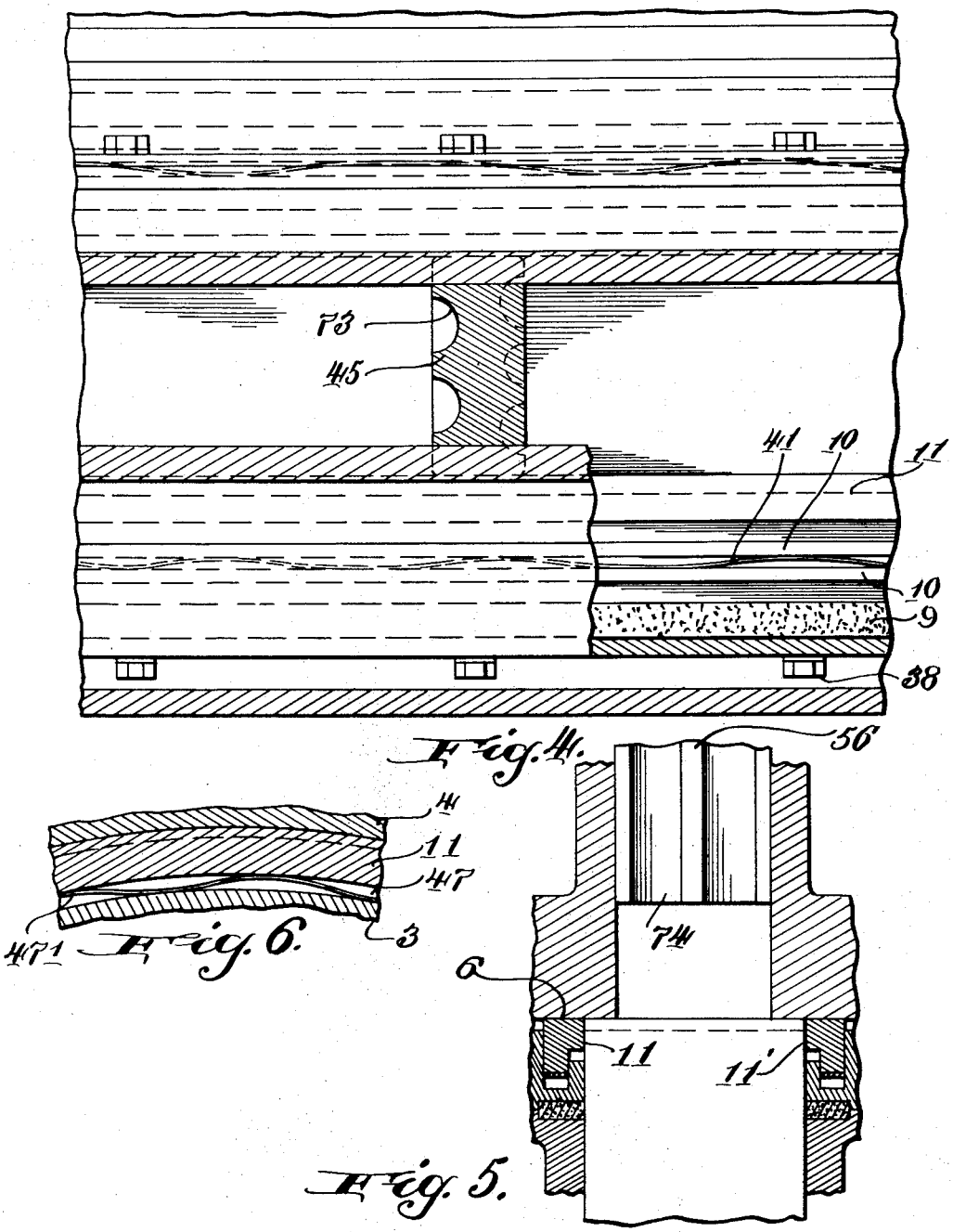

Patented Dec. 12, 1933

1,939,605

UNITED STATES PATENT OFFICE 1,939,605

MOTOR VEHICLE BRAKE

Edwin A. Dempsey, Towson, Md.

Application June 10, 1932. Serial No. 616,382

5 Claims. (Cl. 188—90)

The invention relates to a motor vehicle brake of the hydraulic type. Hydraulic brakes of various types have been applied to motor vehicles and have been subjected to extensive use on the different makes of automobiles. The majority, if not all of the brakes thus in extensive commercial use have been of the type in which the braking pressure is obtained by the application of pressure to or the increase in pressure in a body of liquid or other fluid which is connected to four hydraulic brake units, one of which is arranged in operative relation to each wheel.

While these hydraulic brakes have been satisfactory when new and even after an unlimited term of use when fully serviced and kept in proper repair and adjustment, they have been found to be subject to failure due to loss of pressure by leakage at various points.

These hydraulic brake systems have in many instances proved so unsatisfactory due to the necessity for frequent attention in the form of expensive repairs that in the later models of the same makes of motor vehicles the hydraulic brakes have been replaced by brakes of the purely mechanical type.

The present invention relates to a hydraulic brake of an entirely different type in which a body of hydraulic braking fluid is separately maintained in its operative relation to each wheel. In this type of brake when the wheels are rotating freely, and the vehicle is running without application of the brakes, the fluid is circulated freely at a corresponding speed by paddles or similar means connected to the wheel to move in correspondence therewith. When the retarding influence of the brakes is desired, the circulation of the fluid is checked correspondingly, simultaneously and uniformly in connection with the body of fluid which is circulated as aforesaid in its operative relation to and with each wheel. This checking of the circulation sets up a back pressure which is proportionate to the retarding influence which it is desired to exert. This back pressure may vary from a slight retarding influence to one sufficient to bring the wheels instantaneously almost if not quite to a definite stop. In the preferred operation, however, a slight rotation of the wheels is permitted until the speed of the vehicle is sufficiently reduced so that it may be brought to a standstill without skidding or slippage of the tires on the road surface. It will be understood in this connection that the back pressure referred to reacts against the circulating means which is operated by the respective wheels producing the desired retarding or braking effect described.

The important features of the invention relate not only to the circulating means carried by the wheels and the circulation retarding means carried by a stationary portion of the vehicle but to the details of said means and to the fluid containers and to the means for preventing leakage and to the means for supporting the container and other features and details to be described.

In the preferred form shown the hydraulic fluid is carried in a drum made in two sections, one section being secured to the wheel and the other to a stationary portion of the axle. The wheel also carries paddles which tend to circulate the liquid at all times when the wheels are turning. This circulation is stopped or checked when the brakes are applied.

In the accompanying drawings I have illustrated a vehicle brake embodying the features of my invention in the preferred form.

In the drawings:

Figure 1 is a section through the brake unit of one wheel taken in a radial plane at right angles to the wheel axis.

Figure 2 is a fragmentary section on the line 2, 2 in Figure 1 and in a radial plane including the axis.

Figure 3 is a section on a radial plane including the axis, the lower half of the same being broken away for convenience of illustration. This figure is on a scale slightly larger than the scale of Figure 1. The plane of the section is indicated by line 3, 3 in Figure 1.

Figure 4 is a section on the line 4, 4 in Figure 1, drawn on an enlarged scale.

Figure 5 is a fragmentary section on the line 5, 5 in Figure 1.

Figure 6 is a section on the line 6, 6 in Figure 3.

Figure 7 is an elevation of a vehicle wheel equipped with the brake, showing the brake unit in elevation. The view is taken from a vertical plane which passes through the axle at right angles to the axis as indicated by line 7, 7 in Figure 3.

Figure 8 is an elevation of the brake drum support, which supports the stationary portion of the drum, looking at the same in the direction of the axis.

Figure 9 is an elevation of the same taken at right angles to Figure 8.

Referring to the drawings by numerals, each of which is used to indicate the same or similar parts in the different figures, and having particular reference to the assembly drawings, Figures 1, 3 and 7, the construction shown includes a motor vehicle wheel 1 having spokes 2 to which the rotary portion 3 of the brake drum is secured.

The stationary portion 4 of the brake drum is mounted on a rubber or other suitable preferably yielding hub 5 secured to the axle housing 6 or other suitable non-rotary portion of the axle, which is convenient for attachment of this member 4.

The rotary portion of the brake drum 3 is secured in a suitable manner as by means of bolts 7 to the spokes 2. This portion 3 of the brake drum has an outer peripheral substantially cylindrical wall 8 which is enclosed by the corresponding portion of the stationary section 4 of the brake drum to which it is connected in fluid tight relation by means of packing rings 9, 10, 11, 9', 10' and 11', disposed in annular peripheral cavities 12, 13 and 14, and 12', 13' and 14' formed by registering grooves in the opposed surfaces of the members 3, 4.

In this connection it will be noted that the member 4 is provided with a radial wall 15 in a plane transverse to the wheel axis. This terminates at the inner periphery of this wall or plate 15 in a cylindrical flange 16 which is concentric with the wheel axis. There is also a second flange 17 in alignment with the flange 16 and likewise of annular form. This flange consists of an angle iron in the form of a ring having an outwardly disposed flange 18 secured to the radial wall or plate 15 by bolts 19 arranged along or near the inner periphery of the radial plate or wall 15.

The supporting blocks or hubs 5, as already suggested, are preferably of yielding material, as rubber or fibre, to permit the brake drum member 14 to yield in case of disalignment of the wheel and maintain its cooperative relation with the member 3. This block or hub as shown is grooved or otherwise apertured along their outer periphery at 20, see Figures 8 and 9, to receive the keys 21, which may be secured to the flanges 16, 17 in any suitable manner as by means of rivets 22. The member 4 is further held in its position relatively to the hub 5 by ring plates 24, which may be secured to the keys 21 by cap screws 25. The hub block 5 being slightly narrower than the space between the ring plates 24, keys 21 will have an axillar adjustment along the grooves 20 between the spaced ring plates.

The hubs or blocks 5 are secured to the axle housing in any suitable manner as by means of seating rings 27, one for each drum shown as encircling the housing and secured in any suitable manner by rivets 28. These seating rings 27 may be provided with radially projecting parallel flanges 29 spaced apart to receive the corresponding hub 5. The seating ring 27 is provided with any suitable type of keys 31 parallel to the axis and engaging corresponding grooves 32 formed in the inner periphery of the hub 5. This key 31 may be secured to the flanges 29 by means of bolts 33 or in any suitable manner.

Having reference now to the packing rings 9, 10, 11, 9', 10', 11', seated in the annular cavities 12, 13, 14, 12', 13', 14', the packing rings 9, 9' as shown may be of any suitable type of resilient packing as fibre, metal or rubber enclosed within the annular cavities 12 and 12', formed by registering grooves in the opposed surfaces of the members 3 and 4. These grooves in the present instance are indicated by reference characters 35 and 36. They may be formed in any suitable manner as shown. The groove 35 is formed partially in a ring 37 secured to the stationary member 4 of the drum along its inner periphery on the side adjacent the wheel in any convenient manner as by means of bolts 38. The portion of the groove 35 formed therein is shown as angular of L shape, the third side of the groove being formed by the inner flange of a Z section plate 39 which may be secured to the stationary member 4 by the bolts 10, it being understood that said bolts 10 engage an outwardly projecting flange 40 on the ring 37. The registering groove 36 is shown as formed directly in the outer peripheral face of the member 3.

The annular cavities 13, 13' are partly in the stationary portion of the drum and partly in the rotary portion. They each contain a double ring 10 consisting of two sections of equal diameter and equal in thickness to only about one third of the width of the cavity 13, the two sections of the ring 10 being forced apart and braced against the composite walls of the annular cavity 13, which are at right angles to the axis of the wheel by means of a corrugated ring shaped plate spring 41 which is between the sections of the ring 10, or by any suitable resilient means. In this way any wear on the rings is taken up and the contact is maintained with uniform efficiency.

The inner annular ring cavities 14, 14', as shown, are of L shaped cross section containing L shaped rings 11, 11' which may be connected at their ends by any suitable type of ring joint not shown. These rings are exposed as to one surface at 42 to the radial inner surface 43 of the annular cavity 44 of the drum, the surface 43 being in a radial plane at right angles to the axis of the wheel. To keep this surface 42 in alignment with the surface 43 to prevent interference with the motion of the paddles 45 to be further described, the rings 11, 11' and the annular cavities 14, 14' are made of L shaped cross section, as already stated, the inwardly disposed portion 46 of the L section being seated in a groove 47 in the rotary member 3 which is outwardly disposed and spaced away from the annular cavity 44 by the wall 48. This shank 46 thus serves to hold the ring 11 in alignment and to prevent it from projecting into the annular cavity 44 where it might interfere with the rotating paddles or circulating means 45. The rings 11, 11' are forced outwardly by corrugated springs 47'.

It will be further noted that the packing ring 12' at the right in Figure 3 is held in position by plate ring 49 which corresponds to the ring 39 at the left in the same figure.

Referring now to the braking elements per se, the annular cavity 44 in which the hydraulic fluid is circulated is in the form of the invention shown of quadrilateral cross section, being enclosed on three sides by the stationary member 4 of the brake drum and on the fourth side, i. e. on the inner peripheral side by the rotary member 3 of the brake drum.

Referring now particularly to Figure 1, it will be noted that the rotary member 3 carries circulating paddles 45. These in the form of the invention shown are four in number, being spaced by arcs of 90 degrees. In the form illustrated the circulating members 45 are in the form of radially disposed paddles mounted in guiding sockets 50 which extend inward radially from the outer peripheral circular wall 8 of the rotating member 3. These paddles or circulating members 45 are held nominally advanced by resilient means shown in the form of helical compression springs 52, which are contained within the sockets 50, being compressed between the inner ends 53 of the circulating members 45 and the rear or inner ends 54 of the sockets 50.

These sockets 50 may be formed in any suitable manner. As shown, they are in the form of separate castings or forgings having flanges 55 secured to the inner surfaces of the cylindrical peripheral wall 8 of the member 3 surrounding the guide openings 56 in the said wall 8 of the member 3 through which the circulating members 45 are projected into the cavity 44, as hereinafter further described.

In the preferred form of the invention, the outer end portions of the circulating members 45 are of an area and outline measured in a radial plane including the wheel axis which corresponds closely to the cross section of the annular chamber 44 in the same plane, the circulating members 45 fitting in the chamber with only such slight clearance as may be necessary to the free rotation of the wheels and proper control of the hydraulic fluid to give the desired braking effect.

Cooperating with the circulating members 45 is a retarding member 56 mounted on the stationary portion 4 of the brake drum. This member 56 fits the corresponding cross section of the annular chamber or cavity 44 which as illustrated in Figure 2 may be reduced at this point to provide for the cam surfaces 57 whereby the circulating members 45 are controlled, though this control may be accomplished otherwise in any suitable manner. These cam surfaces 57 as shown are located at each side of the annular chamber 44 though they may be otherwise placed, being shown, see Figures 1 and 2 in the form of shoulders in the sides of the chamber 44, said shoulders being disposed toward the center of the wheel. The inclination of these cam surfaces 57 is relatively gradual, being shown as diverging from the outer wall of the peripheral chamber 44 at 58, 58', and approaching the outer peripheral wall of the member 3, the maximum divergence from the outer peripheral wall 59 of chamber 44 occurring at any suitable point adjacent the location of the stationary retarding member or abutment 56.

As the result of this arrangement, when the wheel 1 is rotated, the circulating members 45 being normally advanced by their springs 52, are depressed and expelled or withdrawn from the annular chamber 44 by the operation of the cam 57, when they reach the location opposite the retarding member 56. This retarding member 56 is located in its withdrawn position in a radial socket 60 which projects outwardly from the outer wall 59 of the stationary member 4 of the brake drum. As shown, this socket 60 is flanged at 62 and secured to said outer wall by rivets 63, although the details are immaterial.

The retarding member 56 may be controlled in any suitable manner. In the form of the invention shown it is provided with a toothed rack section 65 which is engaged by a correspondingly toothed pinion 66 which is mounted on a shaft 67 the pinion being contained within the socket 60 and the shaft projecting outwardly therefrom through a suitably packed bearing not shown. The shaft 67, see Figure 7, is provided at its outer end with an arm 68 secured thereto and connected at its outer end to a brake control rod 69, which is one of four brake control rods connected to a suitable brake pedal not shown. It will be easily understood that by pressure on the brake pedal the pinion 66 in connection with the four respective wheels, will be rotated simultaneously to advance the retarding members 56 to check the circulation of the fluid in the annular chambers 74 whereby the circulating means or paddles 45 and the wheel 1 by which they are carried will be correspondingly checked. The member 56 fits the reduced cross section shown at 70 in Figure 2 while the members 45 fit the full cross section of the chamber 44. In non-braking adjustment the stationary member 56 is withdrawn from the reduced portion 70 of the chamber 44 thus allowing free passage of the liquid under the member 56. The cross section at 70 is reduced by the cams 57, but these cams or a single cam may be otherwise disposed, or other means for withdrawing the circulating members 45 may be provided or the circulation of the fluid may be checked by other means within the broader scope of the invention.

It is of interest that to avoid accumulation of back pressure in the sockets 50 and in the socket 60 back of the circulating members 45 and back of the retarding member 56, the circulating members 45 and retarding member 56 are of fluted or grooved or irregular cross section, see Figure 5, providing passages 73, 74 for the escape of the fluid in a radial direction permitting it to pass said members 45, 56 in said radial direction. This prevents interference with the operation of members 45 and 56, which might result from accumulated back pressure in the sockets 50 and 60.

The operation of the braking apparatus will be easily understood and appreciated from the description of the same and the fragmentary description of the operation of the same embodied in the foregoing description of the said apparatus. As the wheel 1 rotates, the circulating or impelling members 45 circulate the fluid in the annular chamber 44, at a corresponding speed which may be substantially equal to the speed of the wheel and is at least proportionate thereto. The circulating or impelling members 45 are normally advanced so that they close or substantially close the cross section of the chamber 44 advancing or moving the fluid therein as aforesaid at a speed which may be substantially the speed of rotation of the wheel. As the members 45 in turn encounter the cam 57, they are withdrawn at a rate corresponding to the deflection of the cam from the peripheral wall 59 of the chamber 44. This withdrawal corresponds to and is timed to coincide with their approach to and final arrival at a point adjacent the socket 60 which holds the retarding member 56 so that the members 45 can never interfere with the retarding member 56, and as they recede from this point the cam 57 permits the members 45 to be again advanced by the action of the springs 52 until they occupy the full cross section of the annular chamber 44 as shown at the extreme right in Figure 1.

When the retarding effect of the brake is desired, pressure is applied by the driver to the control device, i. e., the pedal or cover, which operates the retarding members 56 through the control rods 69. The member 56 is thus advanced to close the cross section of the annular chamber 44 to a greater or less degree depending upon the degree of retardation desired. If this member 56 is fully advanced corresponding to full braking effect, the cross section will be wholly or substantially closed and the wheels will be with corresponding precision brought to a stationary or non-rotative position, the arrangement being preferably such that full rotation will be checked to a point where there will be sufficient rotation to prevent slipping or skidding of the tires before it is finally stopped.

It is of interest that a fixed quantity of braking fluid is contained within each brake drum though it is within the scope of the invention to connect this brake drum to a permanent supply of fluid under pressure as indicated by the pipe 79 and tank 80 in Figure 7, and a suitable gage may be provided to show the level of liquid which would also insure the presence of sufficient liquid in all the drums giving automatic equalization of the brakes 5. In accordance with the preferred arrangement, there is a filler opening 76 closed by a filler plug 77 through which each unit may be filled at the garage. The loss of fluid from the braking units being normally negligible on account of the efficiency of the stationary packing rings 78 between the guide sockets 50 and the outer cylindrical wall 8 of the member 3.

I have thus described specifically and in detail a braking apparatus for motor vehicles embodying the features of my invention in the preferred form in order that the manner of constructing, applying, operating and using the same may be fully understood, however, the terms herein are used descriptively rather than in a limiting sense, the scope of the invention being defined in the claims.

What I claim as new and desire to secure by Letters Patent is:

1. The combination in a motor vehicle brake of an annular chamber for hydraulic fluid, the said chamber having a portion of its walls secured to a non-rotary portion of the vehicle, and a portion of its walls formed by a member secured to a wheel to rotate therewith, circulating means carried by the wheel, and substantially conforming to the cross section of the chamber, means for advancing the same to close the cross section of the chamber to circulate the fluid in correspondence with the rotation of the wheel, and means for withdrawing said circulating means from said chamber at a predetermined point during each rotation of the wheel, means for retarding the circulation of the fluid carried by a relatively stationary portion of the vehicle at a point adjacent the point of withdrawal of the circulating means, and means within the control of the operator for advancing said retarding means to check the circulation of the fluid and the rotation of the wheels, and means for holding the same normally withdrawn, resilient means for supporting said stationary portion of the annular chamber on the axle.

2. The combination in a motor vehicle brake of an annular chamber for hydraulic fluid, the said chamber having a portion of its walls secured to a non-rotary portion of the vehicle, and a portion of its walls formed by a member secured to a wheel to rotate therewith, circulating means carried by the wheel, and substantially conforming to the cross section of the chamber, means for advancing the same to close the cross section of the chamber to circulate fluid in correspondence with the rotation of the wheel, and means for withdrawing said circulating means from said chamber at a predetermined point, means for retarding the circulation of the fluid carried by the non-rotary portion of the vehicle at a point adjacent the point of withdrawal of the circulating means, and means within the control of the operator for advancing said retarding means to check the circulation of the fluid and the rotation of the wheels and for withdrawing the same, to permit normal operation of the vehicle, packing means between the rotary and non-rotary portions of said annular chamber, the same comprising a packing ring exposed to the inside of said chamber and having a flange for positioning it to prevent projection of the ends of the ring into said chamber in the path of the circulating means.

3. The combination in a motor vehicle brake of an annular chamber for hydraulic fluid, the said chamber having a portion of its walls secured to a non-rotary portion of the vehicle and a portion of its walls formed by a member secured to the wheel to rotate therewith, circulating means substantially conforming to the cross section of the chamber and carried by the wheel, means for advancing the same to close the cross section of the chamber to circulate the fluid in correspondence to the rotation of the wheel, means for withdrawing said circulating means from said chamber at a predetermined point, means for retarding the circulation of the fluid carried by the non-rotary portion of the vehicle at a point adjacent the point of withdrawal of the circulating means, and means within the control of the operator for advancing said retarding means to check the circulation of the fluid and the rotation of the wheels and for withdrawing the same, and packing means between the rotary and stationary portions of said chamber, said packing means comprising a registering groove in the respective rotary and non-rotary portions forming said chamber, two parallel ring sections in said groups, each bridging the gap between said stationary and rotary members and a spring for forcing said ring sections apart into contact with the opposite walls of said grooves.

4. In a vehicle hydraulic brake, comprising a casing having an annular chamber therein, a resilient supporting member for supporting a portion of the casing to a non-rotary portion of the vehicle and a portion of the casing carried by a rotary wheel member, means carried by the rotary portion of the casing for circulating a liquid within the chamber, a liquid retarding valve operative radially of the chamber supported by the non-rotary portion of the casing and adapted to close the annular passage when adjusted to its innermost position, cams positioned within and adjacent the side walls of the annular chamber for depressing the circulating means out of contact with said liquid retarding valve.

5. In a vehicle hydraulic brake comprising a casing having an annular chamber therein, a resilient supporting member for supporting a portion of the casing to a non-rotary portion of the vehicle, a portion of the casing carried by a rotary wheel member, means for mounting the non-rotary portion of the casing on the supporting member in axillar adjustment with the rotating portion of the casing, means carried by the rotary portion of the casing for circulating a liquid within the chamber, a radially operative liquid retarding valve supported by the non-rotary portion of the casing and adapted to close the annular passage when adjusted to its innermost position, cams positioned within and adjacent the side walls of the annular chamber for depressing the circulating means out of contact with said liquid retarding valve.

EDWIN A. DEMPSEY.